July 19, 1932.   G. DOUGLASS ET AL   1,868,002
ELECTRIC REMOTE CONTROL APPARATUS
Filed Oct. 22, 1928   7 Sheets-Sheet 1

Inventors
Gordon Douglass
and
Stanley Robert Wright
By B. Singer Atty.

July 19, 1932. G. DOUGLASS ET AL 1,868,002
ELECTRIC REMOTE CONTROL APPARATUS
Filed Oct. 22, 1928 7 Sheets-Sheet 2

July 19, 1932.   G. DOUGLASS ET AL   1,868,002
ELECTRIC REMOTE CONTROL APPARATUS
Filed Oct. 22, 1928   7 Sheets-Sheet 3
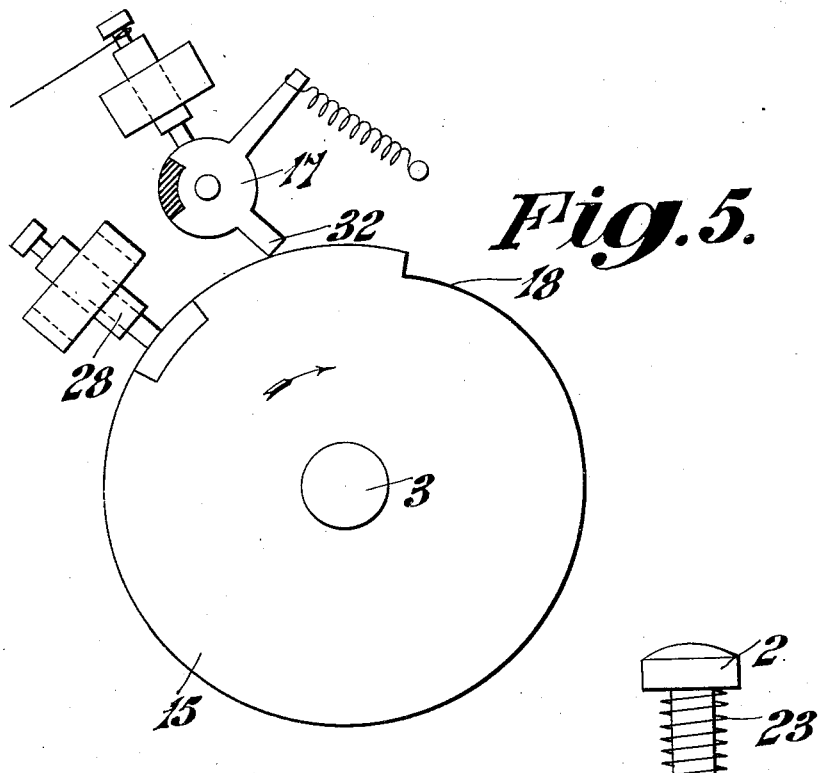
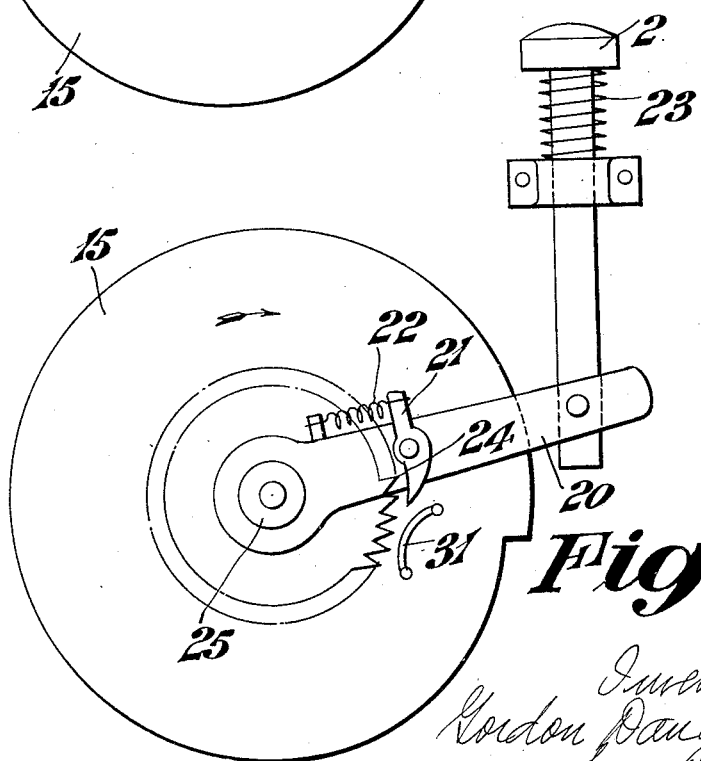

July 19, 1932.  G. DOUGLASS ET AL  1,868,002
ELECTRIC REMOTE CONTROL APPARATUS
Filed Oct. 22, 1928  7 Sheets-Sheet 4

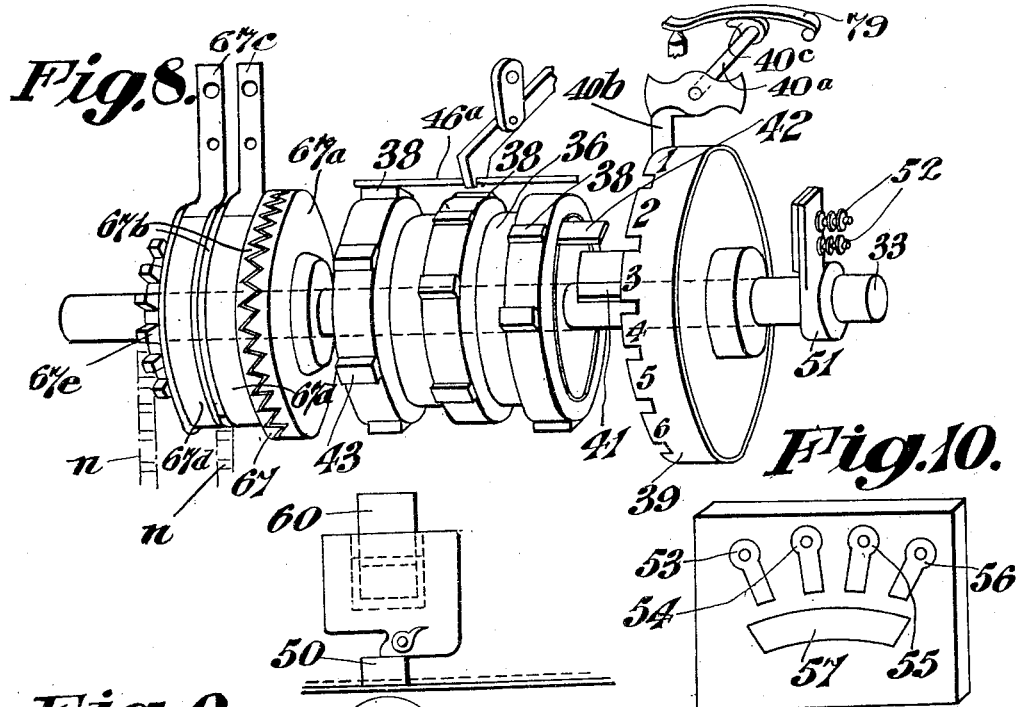
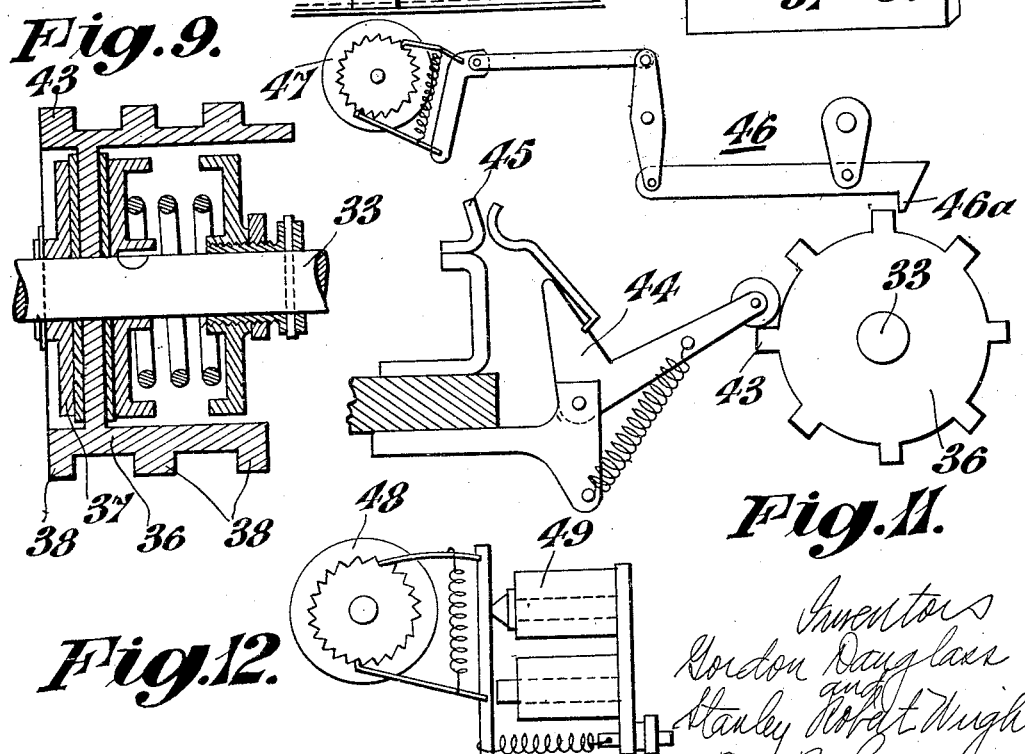

July 19, 1932.     G. DOUGLASS ET AL     1,868,002
ELECTRIC REMOTE CONTROL APPARATUS
Filed Oct. 22, 1928     7 Sheets-Sheet 6

Patented July 19, 1932

1,868,002

UNITED STATES PATENT OFFICE

GORDON DOUGLASS, OF KENSINGTON, LONDON, AND STANLEY ROBERT WRIGHT, OF BEDFORD, ENGLAND

ELECTRIC REMOTE CONTROL APPARATUS

Application filed October 22, 1928, Serial No. 314,258, and in Great Britain October 24, 1927.

This invention relates to, and has for its object the provision of improvements in remote control apparatus.

The invention consists broadly of two units driven by means of a common motor, one of said units being adapted to control said motor so that the same is automatically stopped after said unit has been driven a given amount and the other unit being adapted to control the controlled device or devices, preselecting means being provided for stopping said latter unit after being driven a predetermined amount which amount must be completed before the motor is stopped by the former unit, said latter unit being driven through the medium of a friction clutch so that the motor and the former unit may continue running after said latter unit is stopped.

In order that the invention may be the more clearly understood two signalling systems in accordance therewith for displaying, at various rooms of a hotel, under control from a central operating station, the room number of any visitor who may be wanted will now be described with reference to the accompanying drawings. In each of these systems a display set is located in the vicinity of each room, comprising four rotors each of which carries numerals at spaced intervals around the periphery thereof and which are screened so that only one of each is visible at a time the four visible numerals being in a legible row. Thus by selecting the angular positions of the several rotors any number of less than ten thousand can be displayed in the said room.

It is not necessary in the present specification to describe the display sets in detail. It is sufficient to say that each rotor has three energizing circuits and is adapted to be rotated in a step by step manner in response to the sequential energization of these circuits in cyclic order. In the case of the present systems each rotor has twenty-four steps of rotation per complete revolution and the numerals change in response to each two steps. In U. S. Patent No. 1,098,617 may be seen as example of a rotor adapted to be rotated in a step by step manner in response to the sequential energization of a number of circuits.

In the drawings:—

Figures 5 and 6 are side views to an enlarged scale illustrating the operation of certain of the parts of Figure 4.

Figure 8 is a perspective view of a part of one of the transmission units thereof.

Figure 9 is a sectional elevation of one of the parts shown in Figure 8.

Figure 10 is a perspective view of a contact panel incorporated in each transmission unit.

Figure 11 is an end elevation of certain of the parts associated with each transmission unit.

Figure 12 is an end elevation of other parts associated with said transmission unit.

Figure 13 shows one portion of a diagram of connections of the whole system.

Figure 14 illustrates a mechanical interlock between two push button switches included in Figure 13.

Figure 1:
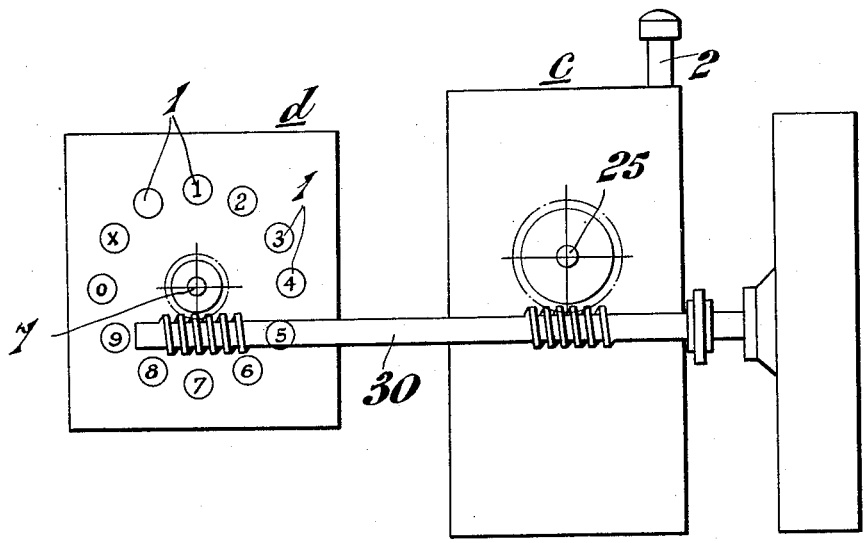
Figure 1 is a side view of one of four controllers employed in one of said systems for respectively controlling the four rotors of each set.
Figure 2:
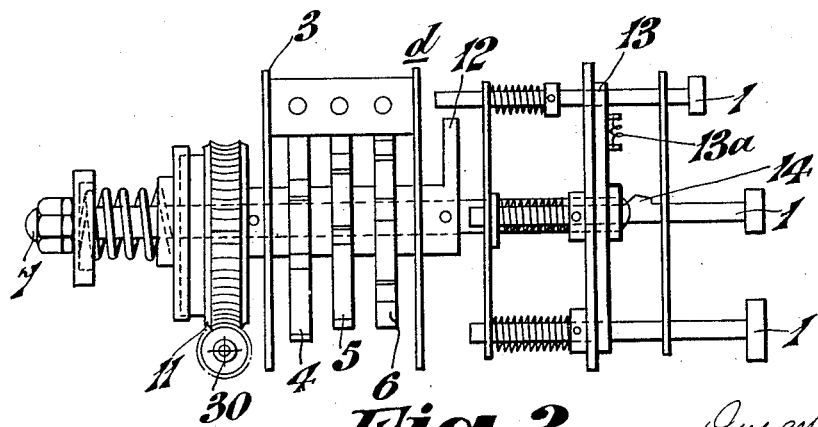
Figure 2 is an end view of a portion of said controller.
Figure 3:
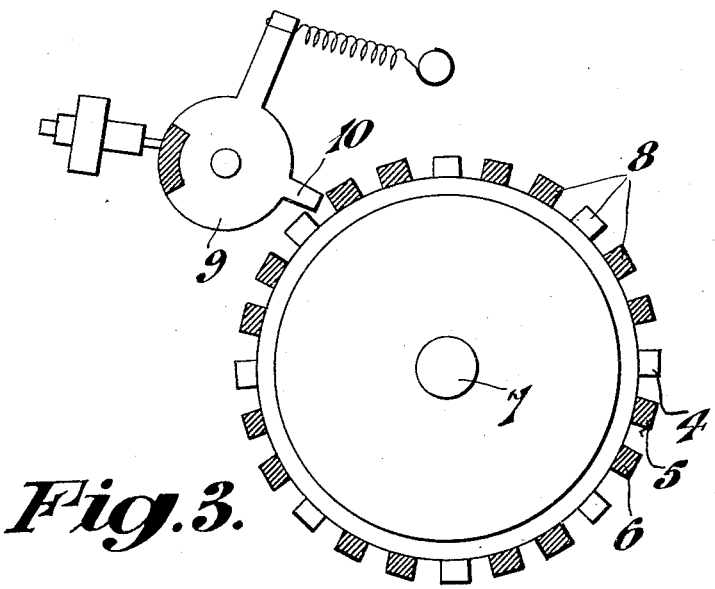
Figure 3 is a side view to an enlarged scale illustrating the operation of certain of the parts of Figure 2.
Figure 4:
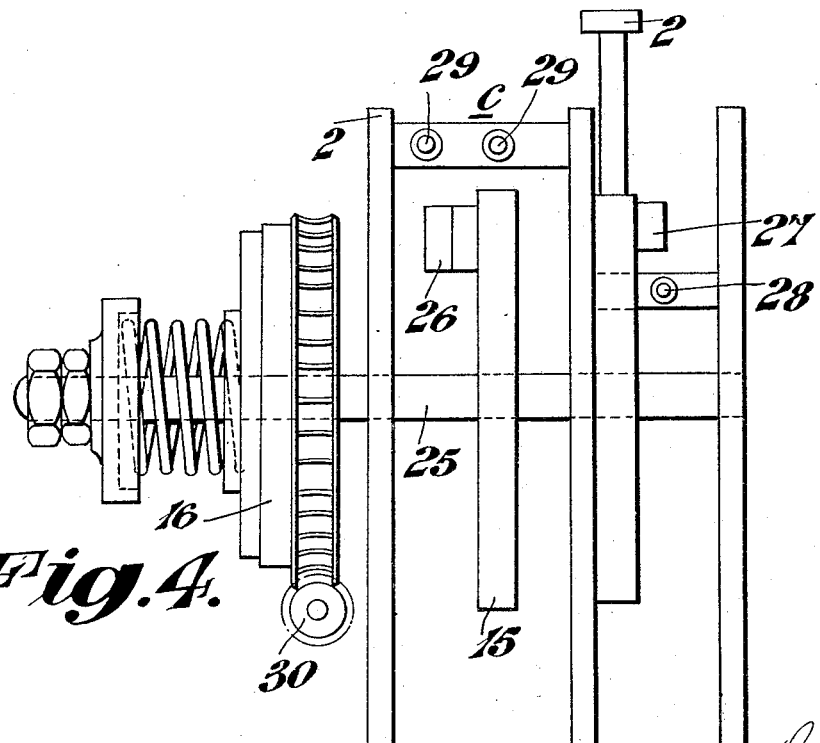
Figure 4 is an end view of another portion of said controller.

Describing first the controller illustrated in Figures 1 to 6 the same comprises ten selector members 1 bearing respectively the numerals from 0 to 9 and a control member 2, the arrangement being such that upon movement of a given selector member to the selecting positions and subsequent actuation of said control member the three circuits of the corresponding rotor (or rotors if more than one display set is employed) will be sequentially energized until such time as said rotor is displaying the numeral carried by the said selector member. The sequential circuit energization will then stop and subsequently a warning note will be sounded and the display number will be illuminated.

Thus said controller comprises one controlling unit c and one dialing unit d. The dialing unit comprises three discs 4, 5 and 6 rigidly mounted on a common shaft 7, the said discs being adapted upon rotation respectively to make and break the three rotor controlling circuits. To this end each disc bears a number of cam projections 8 on its periphery and has an associated normally open switch 9 which said cam projections are adapted to engage and thereby close sequentially. The three switches 9 are respectively connected in the three rotor control circuits. The peripheral cam projections 8 of each disc are staggered with respect to those of the other discs as shown so that the said rotor control circuits will be energized sequentially as the discs rotate and the rotor will move one step each time a peripheral cam projection 8 engages with a switch 9. The total number of cam projections is selected so that one complete revolution of the discs is accompanied by a complete revolution of the rotor and it will thus be seen that the angular position of the discs will always exactly correspond with that of the rotor.

The shaft 7 is adapted to be driven by means of an electric motor through the medium of a somewhat light friction clutch 11. The aforesaid selector members 1 take the form of rods arranged parallel to, and at spaced intervals around said shaft 7. The rods are longitudinally reciprocable each to and from a non-selecting position and a selecting position in which it obstructs the path of a stop projection 12 mounted in rigid relationship with said discs, and the location of the rods is such that when the one bearing a given numeral is moved to its selecting position the said stop 12 will engage with it and effect stoppage of the discs at such a position that the same given numeral will be displayed by the rotor. It will be appreciated that by virtue of the friction clutch 11 the motor is permitted to continue running after the dialing unit has been stopped in this way.

The rods 1 pass through holes in a plate 13 which is oscillatable against and with a spring 13a and said rods having projections 14 which interlock with said holes in such a way that upon any rod being pressed to the operative position any other rod which may be at the operative position flies back to the inoperative position (under the influence of its controlling spring illustrated) said former rod being retained at its operative position until pressure of another rod to its operative position releases it.

The controlling unit c comprises a single disc 15 rigidly mounted on a shaft 25 and adapted to be rotated through the medium of a friction clutch 16 by the same electric motor which drives said dialing unit. This controlling unit is adapted to control a switch 17 in the power circuit of the motor in such a way that at only one position of the disc 15 said power circuit is open and the motor is at rest and at all other positions of said disc 15 said power circuit is closed and said motor is in operation. The control member 2 hereinbefore referred to consists of a longitudinal reciprocable rod actuating a radial arm 20 bearing a pawl 21 and spring 22 said rod being biassed to one end of its stroke by means of a spring 23. The radial arm is so correlated with a ratchet wheel 24 mounted on said shaft 25 that depressions of said rod in opposition to its spring 23, effects rotation of said disc 15 (by permission of said friction clutch 16) through a few degrees. The speed ratio of said disc 15 relative to said discs 4, 5 and 6 is such that the former rotates a little more slowly than the latter.

The disc 15 being at the said position at which the power circuit of the motor is open and the display of a given numeral by the rotor being required, the selecting member 1 bearing the said numeral is moved to the selecting position and the control member 2 is depressed. This latter operation rotates the disc 15 a few degrees and the motor circuit is thereby established. The motor commences to run and both the discs 4 to 6 and the disc 15 are rotated the latter in the same direction in which its movement was commenced by the operation of the control member 2.

When the stop 12 engages the said selecting member 1, the discs 4 to 6 will be stopped and consequently the rotor will be also stopped with the required number displayed. Owing to the speed ratio of the two units above referred to this stoppage of the discs 4 to 6 is bound to occur before the disc 15 has made a complete revolution. When said controlling unit 15 has made a complete revolution the motor power circuit will be once more opened and the motor will stop.

In order that the warning signal and illumination aforedescribed shall be effected said controlling unit carries two contacts 26, 27 which rotate with the disc 15 adapted to engage with respective fixed contacts 28, 29. One of these engagements (27, 28) is adapted to be effected while said disc 15 is at its said motor stopping position and is adapted to establish circuit for illuminating the displayed number as soon as, and so long as, the motor is at rest. The other engagement (26, 29) is adapted to be effected temporarily just before the disc 15 arrives at its said position. This establishes a circuit for sounding a buzzer or the like. Additional contacts can be added for operating other auxiliary circuits if desired.

Lamps of different colours visible to the operator may be adapted to light according as whether the apparatus is in operation or at rest.

It will be clear that for a set of four rotors, four dialing units will be required, one associated with each rotor but only one controlling unit and motor will be required. In this case one selector member 1 of each dialing unit will be set and the control member 2 subsequently depressed.

Describing certain constructional details, the dialing unit or units and the controlling unit are all worm driven from the driving shaft 30 of the motor.

The pawl 21 carried by the arm 20 is adapted to be biassed into engagement with the ratchet wheel by means of a flat spring 31 carried by the disc 15. When said flat spring is moved away from said pawl the latter is biassed away from the ratchet wheel by means of a feeble coil spring 22. Thus said pawl 21 is only operative when the controlling unit is at its motor stopping position and any interference with the control member 2 when the motor is running is ineffective.

The control by the disc 15 of the said switch 17 in the power circuit of the motor is effected by virtue of the co-operation of a recess 18 cut in the periphery of said disc 15 and an operating arm 32 associated with said switch. When the disc 15 is at the given position said arm falls into said recess and the switch is at the open position. When the disc is at any other position said arm rests against the periphery of said disc and the switch 17 is at the closed position.

Figure 7:
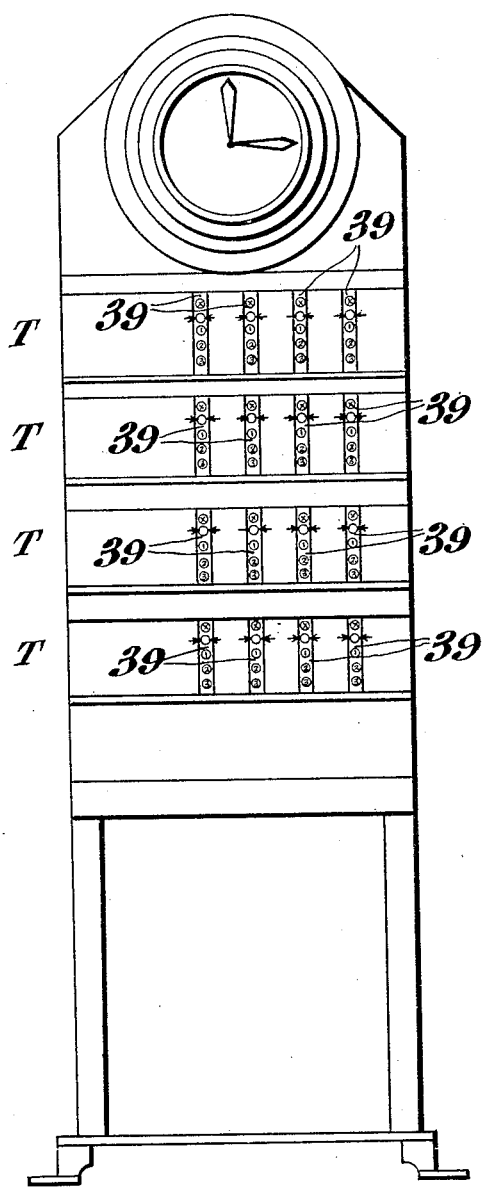
Figure 7 is an outside view in front elevation of the whole control apparatus employed in the other of said systems.
Figure 7A:
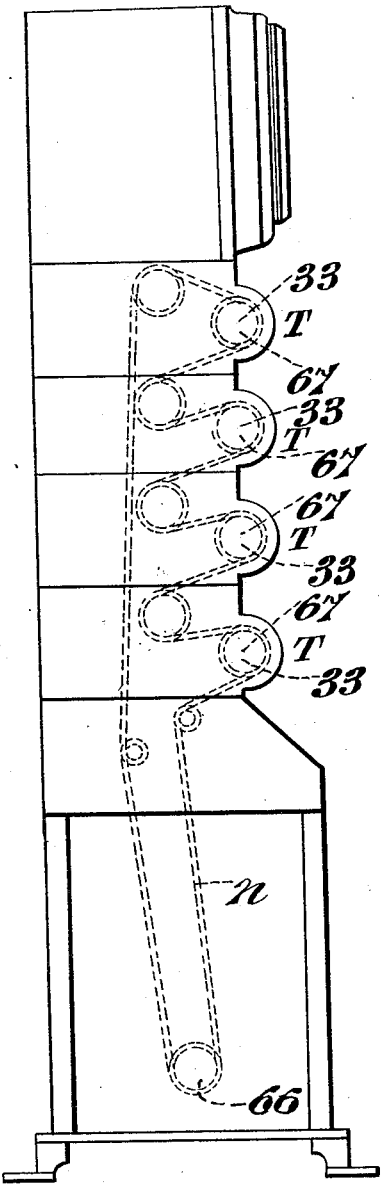
Figure 7a is a similar view in side elevation of the same.

Describing now the system illustrated in Figures 7–13 the controlling apparatus at said central station comprises a common electric motor 66 and a number of transmission units T corresponding to the number of the display sets D. The transmission units are all incorporated into a single structure and are arranged one above the other as indicated in Figure 7.

Each transmission unit T comprises a horizontal shaft 33, an electromagnetic clutch 67 through the medium of which and an endless chain $n$ said shaft is adapted to be driven by said common motor 66, and four selecting devices—one for each of the four rotors $d$ of the display set controlled by said transmission unit. The electromagnetic clutch 67 has one element 67a rigid on the shaft 33 and the other 67b running loose on said shaft. The latter element 67b is hollow and contains the magnet whereby said element is drawn into driving engagement with the element 67a. This magnet is energized through stationary wiping contacts 67c and slip rings 67d mounted on, and insulated from the element 67b. The toothed wheel 67e on which the chain $n$ drives is of course rigid with the element 67b.

Each selecting device comprises a drum 36 mounted concentrically upon said shaft and connected thereto through the medium of a permanent friction clutch 37, three cams 38 mounted rigidly upon said drum, and a selector dial 39 which is free to rotate on said shaft, but may be locked by lock 40 relative to the rigid frame of the unit at intervals of a twelfth of a revolution. Said selector dial carries a stop 41 with which a corresponding stop 42 on the drum is adapted to engage so that when the drum has rotated to a position determined by the setting of the selector dial it is prevented from rotating further.

The said lock 40 is rigidly mounted on a rotatable shaft 40a and has a lug 40b which when said shaft is rocked counter clockwise engages in any one of a number of notches at intervals in the edge of the dial 39 to lock said dial as stated. Said shaft is biased in this direction and is movable manually in the other direction for releasing the dial.

Each cam has eight equally spaced radial projections 43 from its circumferential periphery and the projections of the three cams are at equally staggered intervals. The three cams actuate respective contact fingers 44 which co-operate with respective fixed contacts 45 to make or break the three circuits $x$, $y$, $z$, of the rotor $d$ controlled by the particular selecting device, said fingers 44 being closed on said contacts 45 by the cam projections 43 sequentially in cyclic order, each one being closed eight times per revolution of the drum, so that if the three circuits are not otherwise interrupted, the rotor will make twenty four steps or one complete revolution for each complete revolution of the drum.

The same radial projections of the three cams also operate, through the medium of a train of links 46 the end 46a of which is extended laterally as shown in Figure 8, so that it rides over all three drums, a recording drum 47 bearing type numerals on its periphery, the arrangement being such that the position of said recording drum 47 always corresponds to that of the particular rotor $d$ controlled by the particular selecting device. The four recording drums 47 appertaining to the whole transmission unit T are located side by side and thus correspond in position to the four rotors $d$ of the particular display set D. Alongside these four recording drums 47 are three time recording drums 48 actuated in a step by step manner by means of an electromagnet 49 controlled by means of a clock 49a. These drums carry time type on their peripheries indicative of hours and minutes so that when a printing platen 50 is pressed down on to said drums 47 and 48 a record is printed on a record strip which is moved along by any known means according as the platen 50 is pressed down, both of the numbers being signalled and the time at which the print was taken.

Each transmission unit T also comprises an arm 51 rigidly mounted on the shaft 33 and carrying a bridging contact 52 adapted to bridge four fixed contacts 53, 54, 55, 56 successively with a common fixed contact 57 as the shaft 33 approaches and reaches the end of each revolution. Upon bridging of the first two of these contacts 53 and 54 respective gongs 58 and 59 (Fig. 13) of different pitch in the vicinity of the display set are sounded so that just before the shaft 33 completes each revolution a double note is signalled. Bridging of the third contact 55 effects energization of an electric magnet 60 for pressing down the printing platen 50 and printing a record of the number being signalled and the time the signal was started. The circuit for sounding the gong 59 may be traced from line L1 the lower arm of the double pole switch S through conductors $a$ and $h$ to the particular contact 57, through the bridging contact to the corresponding contact 53, through conductor $p$, the winding of said gong 59 and through conductors $q, m, n$ to the upper arm of said switch S and line L2. The circuit for the gong 58 follows the same path as the preceding circuit to the contact 57 and thence extends through the bridging contact to the contact 54, through conductor $r$ the winding of said gong 58 and thence through conductors $q, m, n$ to line L2 as in the preceding circuit. The circuit for energizing the electromagnet 60 extends as in the preceding circuits to the contact 57 and thence through the bridging contact to the contact 55 and through conductor $s$, said winding 60 and conductors $d, e$ to line L2. Bridging of the fourth contact 56 effects stopping of the motor 66 as will be more fully described hereinafter.

Each transmission unit has associated therewith a transmission-start push button 61, a signal-end push button 62, an electromagnetic switch 63 and an electromagnetic lighting switch 64. The motor clapper switch 63 when energized, closes to establish an energizing circuit for the common motor 66 and an energizing circuit for the particular clutch 67 appertaining to the transmission unit. Said former circuit extends from line L1 through one arm of main switch S conductor $a$, the movable contact of said switch 63, the fixed contact 65 of said switch 63, conductor $b$, said motor 66, the other arm of said switch S back to line L2. Said latter circuit extends from line L1 as previously traced to movable contact of switch 63 and from there through fixed contacts 65$a$, conductor $c$, said clutch 67, and conductors $d$ and $e$ back to line L2.

Said motor clapper switch 63 upon closure also establishes a maintaining circuit for itself. Said circuit extending from line L1 contacts 65$a$ as previously traced and from there through winding of switch 63, resistance $r$ conductor $e$ and upper arm of switch S to line L2.

The electromagnetic lighting switch 64 upon energization closes to establish the circuit of illuminating lamps 69 for illuminating the actual numbers displayed by the particular display set and also the circuit of lamps 69$a$ for lighting up, adjacent said display set, a legend such as, "A message awaits you at the office". Said former circuit extending from line L1, through lower arm of switch S conductor $a$, the movable contact of said switch 64, the fixed contact 64$a$, conductor $u$, said lamps 69 in parallel conductors $f, g, n$, and $e$ and the upper arm of switch S back to line L2. Said latter circuit extends through the upper contact 64$b$ of said switch 64, conductor $v$ through said lamps 69$a$ and back to line L2 as before.

The transmission-start push button 61 has upper contacts 70, 71 which are normally bridged and lower contacts 72, 73 which are bridged upon depression of the button. When said lower contacts are bridged energizing circuit for said motor clapper switch is positively established, and a circuit for energizing the electromagnetic clutch is also directly established. Said former circuit extends from line L1 through lower arm of switch S said contacts 72 and 73, contact breakers 79 whose purpose will hereinafter appear, conductor $c$, the winding of said switch 63, a resistance $r$, conductor $e$ and upper arm of switch S to line L2. Said latter circuit extends as previously traced to circuit breakers 79 and from there through said clutch 67 and conductors $d, e$ and upper arm of switch S back to line L2. When the upper contacts 70 and 71 of said transmission start push button 61 are closed said maintaining circuit for said motor clapper switch 63 is short circuited conditionally upon the contact 56 being bridged with contact 57 as above described, said short circuit extending from the upper end of the winding of said switch 63 through contacts 65$a$, the movable contact of said switch 63, conductors $a$ and $h$, said contacts 57 and 56, conductor $j$ and contacts 71 and 70 to the lower end of said winding of said switch 63.

The signal-end push button 62 has upper contacts 74, 75 which are normally bridged and lower contacts 76, 77 which are bridged upon depression of the button. Said upper contacts 74, 75 are connected in the energizing circuit of the electro-magnetic lighting switch 64 which circuit extends from line L1 through lower arm of switch S, conductor $a$, movable contact of switch 63, auxiliary contact 78 (which is disconnected when said switch 63 is energized) said contacts 74, 75, the winding of said switch 64, conductor $e$ and upper arm of switch S to line L2. Said lower contacts 76, 77 are connected, through conductors h and t, in parallel with contacts 57, 55 in circuit with the energizing winding of said electro-magnet 60 for pressing down said printing platen.

The transmission start push button 61 upon release after depression returns to its normal position at which the upper contacts 70, 71 are bridged. When the signal end push button 62 is released after depression it only returns to an intermediate position at which neither pair of contacts is bridged. A mechanical interlock is provided between the two push buttons so that when the transmission start push button 61 is depressed the signal end push button 62 is returned the full way to its normal position and its upper contacts 74, 75 are bridged. This interlock is illustrated in Figure 14. The contacts of both push buttons 61 and 62 are mounted on a common fixed base B. The moving contacts 61a and 62a are both biased upwards by means of respective springs as shown. Extending downwardly from these moving contacts through the base B are respective rods 61b and 62b. These rods at their lower ends carry heads 61c and 62c, the head 61c coming more or less to a point at its underside as shown. A plate C which is longitudinally movable and is biased to the left has holes as shown through which said heads are adapted respectively to pass. When both push buttons are at their up position the head 62c is located in its hole in the plate C and the head 61c is just above its hole. When the transmission start push button is depressed to its down position the head 61c enters its hole so far as its upper or cylindrical portion and when said push button is released it returns to the up position. When now the push button 62 is depressed to the down position the head 62b leaves its hole and the plate C moves to the left so that when said push button is released it does not return to the up position but to an intermediate position where the head 62c is arrested by the plate C. Said push button 62 will remain in this position until the push button 61 is again depressed when by virtue of the pointed end of its head entering its hole the plate is moved to the right, thereby permitting the push button 62 to return to its up position.

Said four circuit breakers 79 depend for their closure upon the respective locks 40 for the four selector dials 39 of the transmission unit being in operation. Thus when shaft 40a (Figure 8) is rotated in counter clockwise direction a cam 40c on said shaft moves circuit breaker 79 to open position.

When it is required to actuate a given display set D, the selector dials 39 of the corresponding transmission unit T are set according to the numerals which the four rotors of the display set D are required to show and the transmission-start push button 61 of said transmission unit is depressed momentarily. Accordingly, the selector dials 39 being properly locked and the circuit breakers 79 being therefore closed, circuits are established as previously described for energizing the electro-magnetic clutch 67 and also the motor clapper switch 63. Said clapper switch thereupon closes thereby establishing as aforedescribed a circuit for the common motor 66; a second circuit for the electro-magnetic clutch 67 so that the same will remain engaged when the transmission-start push button 61 is released and a maintaining circuit for itself.

The motor accordingly starts to run rotating the shaft 33 through the medium of said clutch 67. By the time the transmission start push button 61 is released the contact 56 will be disconnected from the bridging contact 52 and therefore the maintaining circuit for the motor clapper switch coil will not be short circuited through the upper contacts 70 and 71.

The four drums 36 will be rotated with the shaft 33, the corresponding display rotors d and recording drums 47 and 48 rotating in synchronism therewith, and as each rotor d arrives at its predetermined position, the corresponding drum 36 will be stopped by engagement of the stops 42 and 41 the friction clutch 37 slipping as the shaft 33 goes on. By the time the shaft 33 has almost completed one revolution the rotors d and recording drums 47, 48 will all be set and stationary. First the two fixed contacts 53 and 54 will be sequentially bridged with the common fixed contact 57 and the double note will be sounded on the gongs 58 and 59 as previously described, and next the contact 55 will be so bridged whereupon the printed record of the number signalled will be made as aforesaid. Finally the fixed contacts 56 will be bridged whereby, the transmission start push button 61 being at normal, the winding of the motor clapper switch 63 will be short circuited through contacts 70 and 71 as previously described and said clapper switch will open thereby de-energizing the electromagnetic clutch 67 and the motor 66 and bringing the shaft 33 to rest.

At the same time the auxiliary contacts 78 of the clapper switch 63 will close and, the signal-end push button 62 being at normal, energizing circuit for the winding of the lighting switch 64 will be established as previously described through contacts 74 and 75 and the lamps 69 and 69a will be illuminated.

When it is required to signal another number with said display set the process is repeated, the selector dials 39 being reset and the transmission-start push button 61 being again momentarily depressed. It will be observed that upon the clapper switch 63 closing, the auxiliary contact 78 will open and break the energizing circuit for the lighting switch 64 so that the illumination will go off immediately the transmission of the new signal is commenced.

If, although no new signal is required, it is deemed that a signal has been displayed long enough the signal end push button 62 is depressed thereby breaking the said energizing circuit of the lighting switch 64 and making, through contacts 55, 57 as previously described, the energizing circuit for the winding 60 operating the printing platen 50. The illumination is accordingly switched off and a printed record is made of the signalled number and the time at which said illumination was switched off. Upon release of the signal-end push button 62 the printing platen 50 is returned to normal but as said push button does not return to bridge its upper contacts but remains at an intermediate position the illumination is not again switched on.

When the transmission start push button 61 is again depressed for transmitting another signal, the signal end push button 62 is returned to its upper position as before stated so that the circuit for the lighting switch 64 will be again completed when the shaft 33 has made its complete revolution and the new signal is set.

Figure 13A:
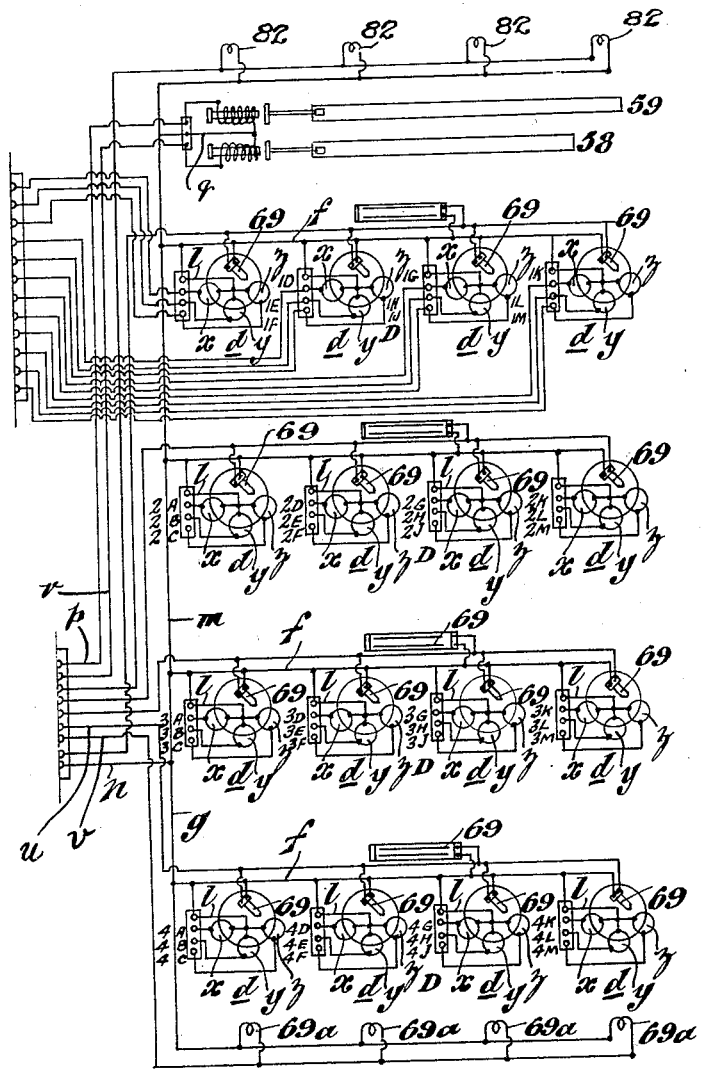
Figure 13a shows the other half of the same.

The individual connections by which the three circuits $x, y, z$ of each rotor are sequentially established by the operation of the corresponding fingers 44 are shown only in the case of the top set of rollers in Figures 13 and 13a in which the points 1A—1M of Figure 13 are shown connected to the corresponding points of Figure 13a. In fact, the points 2A—4M of these two figures are also similarly connected. It will thus be seen when any finger 44 is closed a corresponding circuit is established through a rotor $d$ said circuit extending from line L1, through lower arm of switch S, conductors $a$ and $k$, through said finger 44 to (say) point 1A on left hand side of the figure, to point 1A on right hand side of figure, through the left hand circuit of the adjacent rotor $d$, conductors $l$, $m$, $n$ and $e$ and upper arm of switch S back to line L2.

The numeral 82 designates pilot lamps at the central station which as will be clear from the drawings are energized or not according as whether the main switch S is or is not switched on.

What we claim and desire to secure by Letters Patent is:

1. In a remote control apparatus, a revoluble transmitter, a motor, a clutch adapted to transmit power from said motor for driving said transmitter, means for starting said motor, preselecting means for stopping said transmitter at a preselected rotary position, whereupon said clutch is adapted to slip, a rotary controller adapted to be driven by said motor, a "transmission-start" switch having positions $a$ and $b$, an electromagnetic main switch for said motor, means whereby movement of said "transmission-start" switch to position $b$ effects energization of said main switch, means for establishing a maintaining circuit for said main switch upon closure thereof and means whereby upon arrival of said controller at a given position said maintaining circuit is short circuited only if said "transmission-start" switch has returned to position $a$.

2. In a remote control apparatus, a plurality of transmitters, a common motor, respective friction drives for transmitting power to said transmitters from said common motor, respective preselecting means for stopping the transmitters at any desired position and means for causing the motor to start in operation and continue in operation until a complete cycle is finished whereby all of the transmitters are simultaneously moved until stopped by the preselecting means.

3. In a remote control apparatus a plurality of groups of transmitters, a common driving motor for all of said groups, group electro-magnetic clutches through which said groups are adapted to be respectively driven, individual friction clutches in series with said group clutches through which the individual transmitters are adapted to be respectively driven, individual preselecting means for stopping the individual transmitters at preselected positions, starting means in connection with each group upon operation of which the respective group clutch is adapted to be closed and the motor simultaneously energized, and means for automatically stopping said motor and opening said group clutch after said motor has run a given amount sufficient to ensure that the movement of all the transmitters of the group has been completed whatever the setting of the preselecting means.

4. In a remote control apparatus, a plurality of groups of transmitters, a common driving motor for all of said groups, group electromagnetic clutches through which said groups are adapted to be respectively driven, individual frictional drives, through which the individual transmitters are adapted to be respectively driven, individual means for preselecting the amount through which said individual transmitters are to be respectively moved and starting means in connection with each group upon operation of which the respective group clutch is adapted to be closed and the motor simultaneously energized.

In witness whereof we affix our signatures.

GORDON DOUGLASS.
STANLEY ROBERT WRIGHT.